Sept. 17, 1940.  E. E. HEWITT  2,215,355
BRAKE AND PROPULSION CONTROL ACTUATOR
Filed Feb. 25, 1939   3 Sheets-Sheet 1
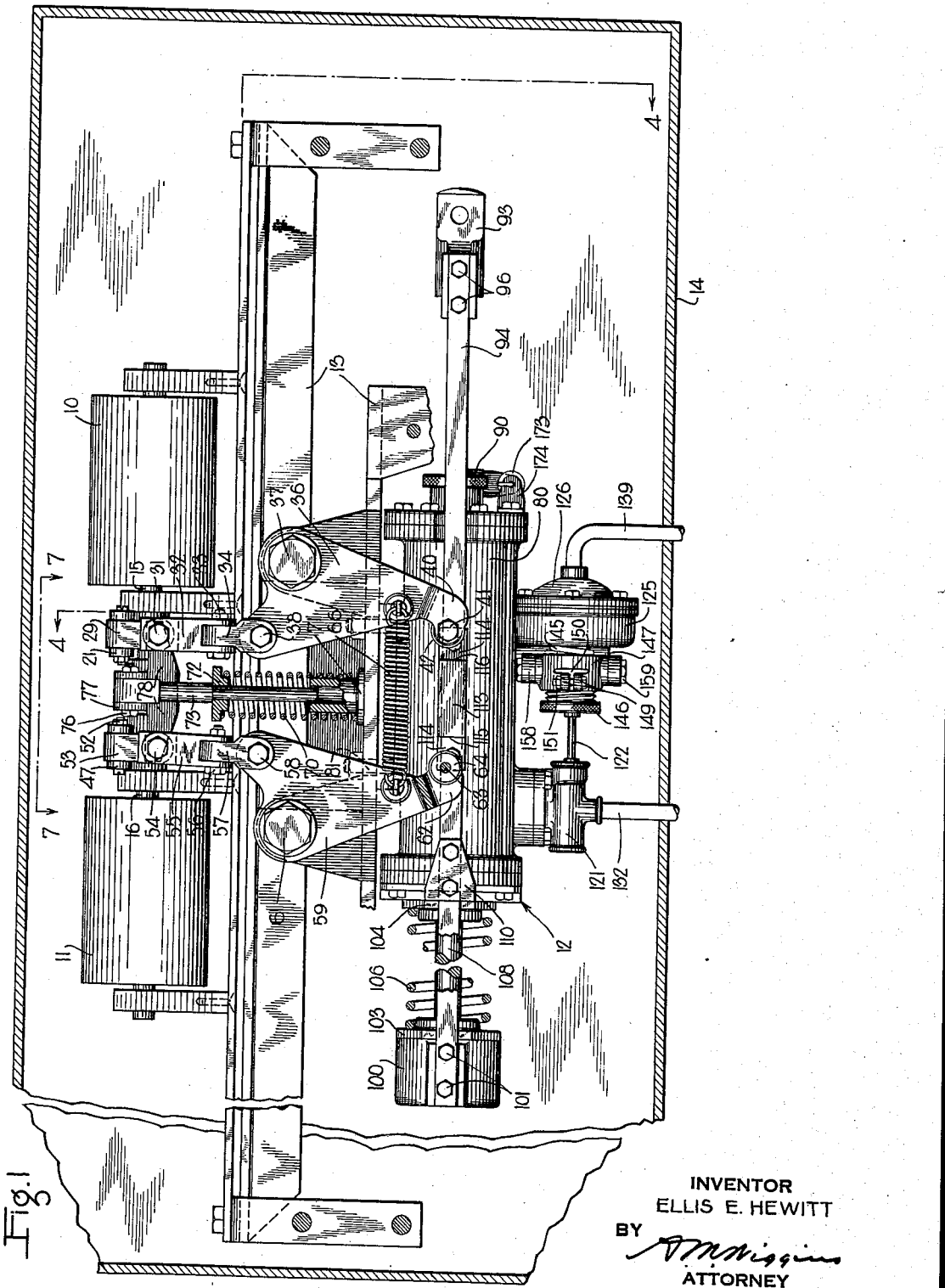
INVENTOR
ELLIS E. HEWITT
BY
ATTORNEY Sept. 17, 1940.  E. E. HEWITT  2,215,355
BRAKE AND PROPULSION CONTROL ACTUATOR
Filed Feb. 25, 1939  3 Sheets-Sheet 2
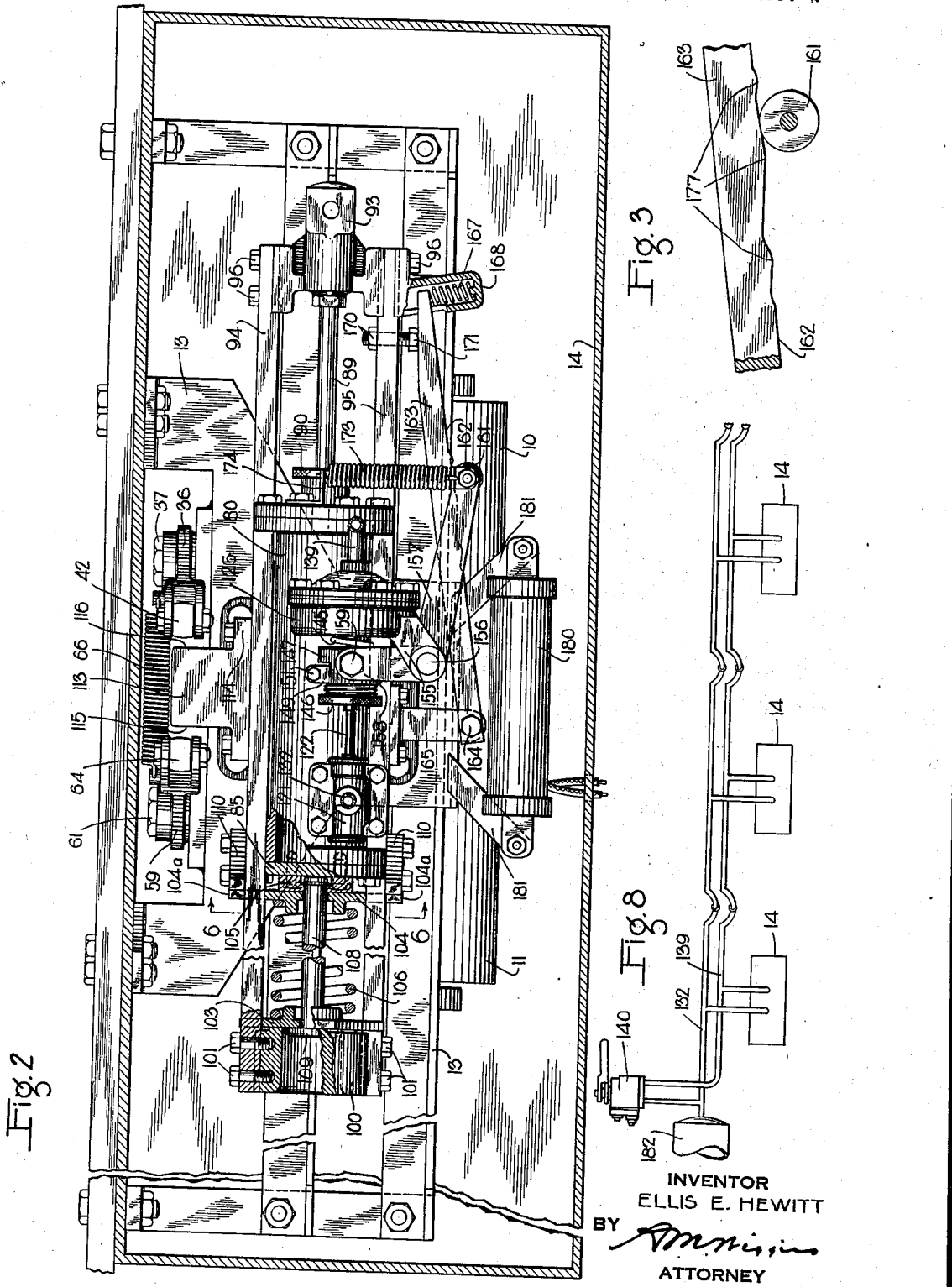
INVENTOR
ELLIS E. HEWITT
BY
ATTORNEY Sept. 17, 1940.  E. E. HEWITT  2,215,355

BRAKE AND PROPULSION CONTROL ACTUATOR

Filed Feb. 25, 1939  3 Sheets-Sheet 3

INVENTOR
ELLIS E. HEWITT
BY
ATTORNEY

Patented Sept. 17, 1940

2,215,355

UNITED STATES PATENT OFFICE 2,215,355

BRAKE AND PROPULSION CONTROL ACTUATOR

Ellis E. Hewitt, Wilkinsburg, Pa., assignor to The Westinghouse Air Brake Company, Wilmerding, Pa., a corporation of Pennsylvania Application February 25, 1939, Serial No. 258,443

21 Claims. (Cl. 192—2)

This invention relates to railway vehicle controlling equipments, and more particularly to a fluid pressure responsive apparatus for controlling both propulsion and braking of a vehicle.

In the design of modern types of motor driven traction vehicles, such for example as those developed by the Electric Railway Presidents' Conference Committee and commonly referred to as PCC street cars, there has been provided a braking system comprising a dynamic brake, a fluid pressure brake, and an electric track brake, which three brakes are adapted to be automatically controlled in a predetermined sequence by suitable brake controlling means. In addition, such vehicles are equipped with propulsion controlling means of advanced design, which may be operated independently of the brake controlling means.

In order to meet transit service requirements in large metropolitan areas, it has been proposed to provide motor driven vehicles designed somewhat differently from the above so-called P. C. C. street cars but having similar braking and propulsion control systems, together with means whereby such vehicles are adapted to be operated as units in a train which may be controlled by a motorman stationed in the leading vehicle. To provide maximum efficiency and ease of operation of a train of vehicles so equipped, it is desirable to provide means adapted to be carried on each vehicle and operative to actuate both the associated brake controlling means and the propulsion controlling means in exactly similar increments or steps, with respect to the similar apparatus on each of the other vehicles, as determined by variations in the pressure of fluid in a control pipe effected by the motorman in the leading vehicle.

One object of the present invention is to provide a fluid pressure responsive brake and propulsion control actuator device for a vehicle in a train, which is operative in response to variations in a control pressure for effecting either operation of the propulsion motors of the vehicle at a desired rate, or application of the brakes to any predetermined degree, at the will of the motorman in charge of the train.

Another object of the invention is to provide an actuator device for an equipment of the above type comprising operating means having a normal or coasting position, wherein the motive power is cut off while the brakes are released, and movable from coasting position in one direction for effecting operation of a propulsion controller, and in another direction for effecting operation of a brake controller, the operating means including fluid pressure responsive mechanism operative to effect movement of the operating means in either direction to a position predetermined in accordance with variation in the pressure of fluid in a control pipe and to maintain the mechanism in the selected position until further change is effected in the control pipe pressure.

It is another object of the invention to provide, in a vehicle controlling equipment of the above type, a combined brake and propulsion control actuator device including movable abutment means operative in one direction from an intermediate or coasting position for controlling propulsion of the vehicle and in another direction for controlling application of the brakes, and a self-lapping valve mechanism operative in accordance with variations in the pressure of fluid in a normally charged control pipe for controlling the supply and release, at opposite sides of the abutment, of fluid under relatively high pressure, whereby adequate power for operating the brake and propulsion controllers may be supplied and controlled while maximum sensitivity of operation is ensured.

Other objects and advantages of the invention will appear in the following more detailed description thereof, taken in connection with the accompanying drawings, in which Fig. 1 is a plan view, partly in section, of a brake and propulsion actuator mechanism constructed in accordance with the invention;

Fig. 2 is a vertical elevational view, partly in section, of the actuator mechanism shown in Fig. 1;

Fig. 3 is an enlarged detail fragmentary view of the roller element and cam bar of the mechanism shown in Fig. 2;

Figure 7:
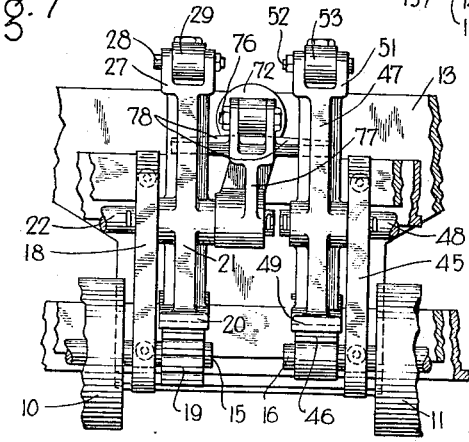

Fig. 7 is a fragmentary view, partly in section, of the portion of the mechanism indicated by the line 7—7 of Fig. 1; and Fig. 8 is a diagrammatic view illustrating a plurality of brake and propulsion control actuator mechanisms associated in a train equipped with a control pipe, a main reservoir supply pipe, and a valve device adapted to be carried on the leading vehicle for controlling the control pipe pressure.

Referring to the drawings, and particularly to Fig. 1, the control equipment adapted to be carried by each vehicle includes a rotary propulsion controller mechanism 10, a rotary brake controller mechanism 11 coaxially aligned therewith, and an actuator mechanism indicated generally at 12, each of which mechanisms may be suitably mounted, as hereinafter more fully explained, on a frame structure 13 which is in turn mounted within a protective housing 14 carried by the vehicle. The propulsion controller mechanism 10 which is illustrated in simplified outline form in the drawings, may be of any desired type having a rotary shaft 15 and a suitable circuit controlling mechanism associated therewith for regulating the operation of the usual propulsion motors in accordance with the turning of the shaft. The brake controller mechanism 11, which is likewise not illustrated in detail, is provided with a rotary shaft 16 operative to control application and release of the usual dynamic, track and fluid pressure brakes, and may, for example, be constructed somewhat similarly to the controller shown in the U. S. Patent 2,112,423, issued to Joseph C. McCune on March 29, 1933.

Figure 4:
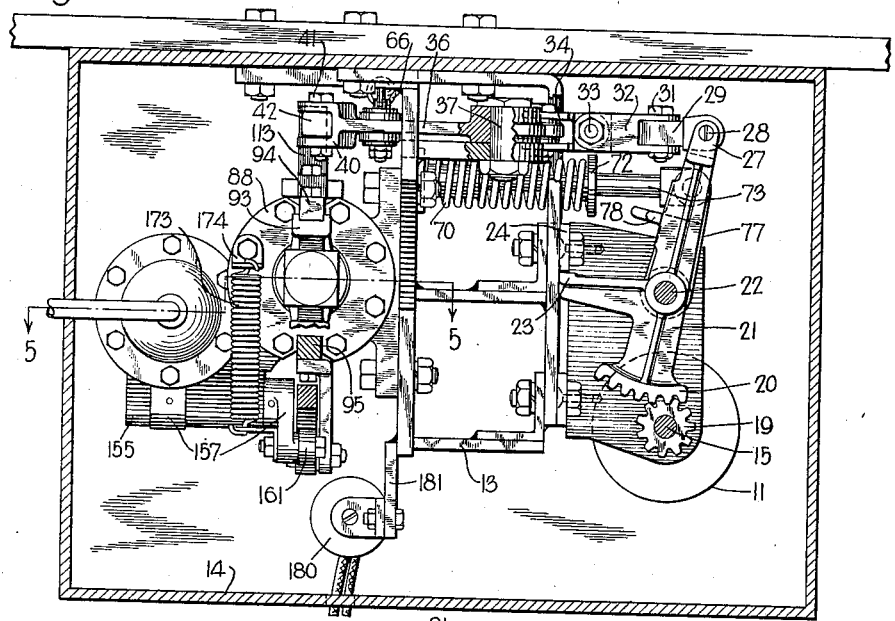
Fig. 4 is a side elevational view, partly in section and taken substantially along the line 4—4 of Fig. 1.

As shown in Fig. 7 of the drawings, the end of the shaft 15 projecting from the propulsion controller mechanism 10 extends through an opening in a bracket element 18 secured to the frame structure 13, and has keyed thereon a pinion 19, which is operatively intermeshed with a toothed rack portion 20 of a controller lever 21, which is in turn journaled intermediate its ends on a pin 22 carried by the bracket element. As is shown in Fig. 4, the portion of the controller lever 21 adjacent the journal pin 22 has formed thereon a projecting lug portion 23 which is engageable with a stop portion 24 of the frame structure 13 when the controller arm is held in its normal position as illustrated. The upper end of the controller arm member 21 has an apertured clevis portion 27 formed thereon, through which extends a horizontally disposed pin 28 to which is connected a link element 29. As shown in Figs. 1 and 4, the link element 29 is also pivotally connected by means of a vertically disposed pin 31 to a link member 32, which is in turn pivotally connected by a horizontally disposed pin 33 to another link member 34.

In operative alignment with the link member 34 there is provided a bell crank lever 36 which is journaled on a vertically disposed bolt 37 secured to the bracket structure 13 and is pivotally connected to the link member by means of a pin 38. As is shown in Fig. 1 of the drawings, an arm portion of the bell crank lever 36 is provided with a clevis portion 40 carrying a vertically disposed pin 41 on which is rotatably mounted a roller 42, the function of which will be hereinafter more fully explained.

Referring again to Fig. 7 of the drawings, the rotary shaft 16 of the brake controller mechanism 11 is suitably journaled in a bracket member 45 that is carried by the frame structure 13, and has secured on the outer end thereof a pinion 46. A substantially vertically disposed controller lever 47, similar to the lever 21 already described, is pivotally mounted intermediate its ends on a pin 48 carried by the bracket member 45, and has formed on the lower end thereof a toothed rack portion 49 which operatively engages the pinion 46. A clevis portion 51 formed on the upper end of the lever 47 is pivotally connected by means of a pin 52 to a link member 53, the other end of which is pivotally connected by means of a vertically disposed pin 54 to an intermediate link member 55, as shown in Fig. 1 of the drawings. The link member 55 is in turn pivotally connected by means of a pin 56, disposed at right angles with respect to the pin 54, to a link member 57 which is also pivotally connected by a vertical pin 58 to one arm of a bell crank lever 59. The bell crank lever 59, like the lever 36, is journaled on a vertically disposed bolt or pin 61 that is carried by the frame structure 13, and has formed on the other arm thereof a clevis portion 62. Journaled on a pin 63 carried by the clevis portion is a roller 64, which is disposed in operative alignment with the roller 42 carried by the bell crank lever 36.

A tension spring 66 having one end thereof secured to the bell crank lever 59 adjacent the clevis portion 62 and the other end similarly connected to the bell crank lever 36 adjacent the clevis portion 40, is provided for urging the levers into the normal position as shown in Fig. 1.

Means is provided for normally maintaining the propulsion controller mechanism 10 and brake controller mechanism 11 in their coasting and release positions, respectively, comprising a coil spring 70 which is interposed between a spring guide member 71 mounted on the frame structure 13 and a retainer member 72 fitted on a horizontally disposed plunger 73, one end of which is slidably mounted in a bore in the member 71. The other end of the plunger 73 is journaled on a pin 76, which as is best shown in Fig. 7 of the drawings, pivotally connects the plunger to a clevis portion of a return arm 77 which is journaled on the pin 22 adjacent the arm member 21. The return arm 77 has formed thereon laterally extending wing portions 78, which are respectively engageable with the inner surfaces of the controller levers 21 and 47 and transmit the force of the spring 70 thereto for resisting movement of either lever from the normal position shown in the drawings.

Figure 5:
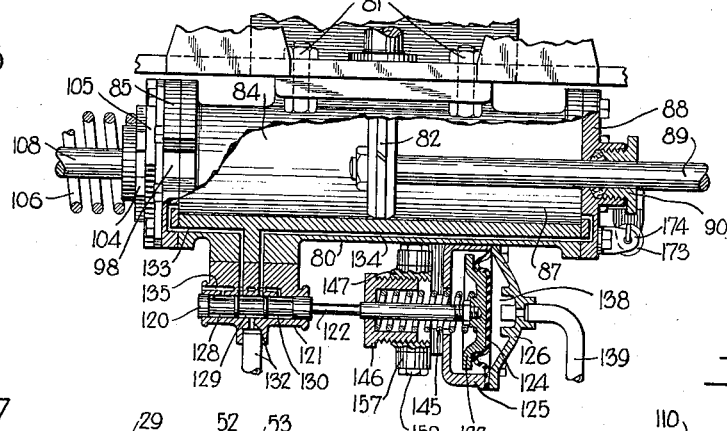
Fig. 5 is a fragmentary sectional view taken substantially along the line 5—5 of Fig. 4.

The actuating mechanism 12 comprises a cylinder 80 disposed in parallel relation with the brake and propulsion controller mechanism and secured to the frame structure 13 by suitable means such as bolts 81, and having formed therein a longitudinal bore within which is slidably mounted a piston 82, as shown in Fig. 5 of the drawings. The piston 82 is subject on one side to the pressure of fluid in the chamber 84, the outer end of which is closed by a head 85 bolted or otherwise secured to the cylinder, and on the other side to the fluid pressure in a chamber 87 which is similarly closed by means of a head 88 carried by the cylinder. Secured to the piston 82 is a piston rod 89 which extends through the chamber 87 and a suitable aperture in the head 88. A packing gland 90 is fitted about the piston rod 89 and in screw threaded engagement with a portion of the head 88 for preventing leakage of fluid under pressure from the chamber 87.

Figure 6:
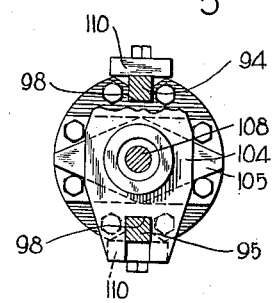
Fig. 6 is a fragmentary sectional view taken along the line 6—6 of Fig. 2.

As shown in Figs. 1 and 2 of the drawings, the outer end of the piston rod 89 is secured by suitable means to a cross head member 93, which is transversely disposed between the adjacent ends of a pair of guide bars 94 and 95 that are secured to the cross head by suitable means such as bolts 96. The guide bars 94 and 95 are similar in form, being preferably square in cross section, and are considerably longer than the cylinder 80, which is adapted to support both rods in sliding engagement within suitable grooves formed in the heads 85 and 88 and corresponding flange portions of the cylinder as indicated by the reference character 99 in Fig. 6 of the drawings. The ends of the guide bars 94 and 95 extending beyond the cylinder 80 are secured to opposite sides of a cylindrical head member 100 by means of bolts 101, which head member is normally spaced from the head 85 of the cylinder.

It will thus be seen that the guide bars 94 and 95 with the cross head 93 and head 100 constitute a rack structure adapted to be shifted as a unit with respect to the stationary cylinder 80. Interposed between the head member 100 and the cylinder 85 are a spring retainer member 103 which is adapted to engage the head member 100, a spring retainer member 104 adapted to engage a plate 105 bolted to the cylinder head 85, and a coil spring 106 adapted to exert pressure against both the retainer members for normally maintaining in an intermediate position the connected head member 100, guide bars 94 and 95, cross head 93, piston rod 89 and piston 82, as shown in the drawings.

It will be noted that the spring retainer members 103 and 104 have slots formed in opposite sides thereof for receiving the respective guide bars 94 and 95, and are centrally apertured to receive a longitudinally disposed plunger member 108, one end of which carries a head 109 disposed within the cylindrical head member 100 and adapted to engage the retainer member 103, and the other end of which is anchored by suitable means to the plate member 105 carried by the cylinder head 85. The spring retainer member 104 is provided with terminal portions 104a extending outwardly beyond the respective guide bars 94 and 95 and adapted to be engaged by abutment plates 110 bolted to the guide bars, upon movement of the piston and associated elements operated thereby to the left, as viewed in Fig. 2 of the drawings.

As is best shown in Fig. 1 of the drawings, the rollers 64 and 42 carried by the respective bell crank levers 59 and 36 are disposed above and in alignment with the slidable guide bar 94. A cam block 113 is mounted on the guide bar 94 substantially intermediate the ends thereof, and is provided with flanges 114 by means of which the block may be bolted or otherwise secured to the guide bar. The cam block 113 has formed thereon a vertical bearing face 115 which is adapted for engagement with the roller 64 when the actuator mechanism is operated for controlling the brakes as hereinafter explained, and an opposite bearing surface 116 engageable with the roller 42 during operation of the actuator mechanism for controlling propulsion of the vehicle.

A self-lapping valve mechanism is provided for controlling supply and release of fluid under pressure to and from each of the piston chambers 84 and 87, shown in Fig. 5, comprising a valve plunger 120 slidably mounted in a suitable bore formed in a casing section 121 carried by the cylinder 80, which plunger is adapted to be operated through the medium of a stem 122 and follower member 123 by a flexible diaphragm 124 that is interposed between a circular casing section 125 carried by the cylinder 80 and a cover plate 126 secured to the casing section by bolts or the like.

The valve plunger 120 is lap fitted within the bore in the casing section 121 and has formed thereon annular grooves 128, 129 and 130, which are adapted to control both the supply of fluid under pressure from a supply pipe and port 132 through passages 133 and 134 to the piston chambers 84 and 87, respectively, and the discharge of fluid under pressure from those chambers by way of an exhaust passage 135, according to the positioning of the valve plunger.

The diaphragm 124 is subject on one side to the pressure of fluid in a chamber 138 communicating with a control pipe 139, which is adapted to extend throughout the train, as indicated diagrammatically in Fig. 8 of the drawings, and which is adapted to be maintained charged with fluid at a normal pressure by the automatic operation of a motorman's control valve device 140 carried on the leading or operating vehicle. The control valve device 140 may be of a suitable and well known type operable either to increase the pressure of fluid in the control pipe 139 above the normal pressure when it is desired to effect propulsion of the train, or to effect reduction in the control pipe pressure for causing application of the brakes. Referring again to Fig. 5, the diaphragm 124 is also subject to the force of a coil spring 145, which is adapted to oppose the pressure of fluid in the chamber 138, and is interposed between the follower member 123 and an adjustable spring retainer member 146 having screw-threaded connection in an annular socket member 147, which is arranged for movement relatively to the valve stem 122 and associated elements for varying the force exerted by the spring 145 as hereinafter explained. As shown in Fig. 1, a pair of lugs 149 are provided on the socket member 147 adjacent a slot 150 formed therein, which lugs are suitably apertured to receive a lock bolt 151 adapted to clamp the lug portions inwardly for preventing undesired movement of the retainer member 146 from its adjusted position.

Referring to Fig. 2 of the drawings, it will be noted that the diaphragm casing section 125 has formed thereon suitably inclined lug portions 155 having a transversely disposed bore in which is journaled a trunnion portion 156 of a bell crank lever 157, one arm of which is bifurcated to provide portions 158 straddling the socket member 147 and pivotally connected thereto by means of pins 159. On the other arm of the bell crank lever 157 is mounted a roller 161 adapted to ride on a bearing surface 162 of an inclined cam bar 163, one end of which bar is secured by a bolt 164 to a bracket 165 carried by the guide bar 95, and the other end of which is yieldingly supported by a spring 167 contained in a cage element 168 that is also secured to the guide bar 95. As shown in the drawings, the spring 167 is adapted to urge the cam bar 163 inwardly and toward the guide bar 95, which is provided with an adjustable bolt element 170 having a head 171 adapted to engage the cam bar for positioning it against the force of the spring 167. In order to prevent accidental displacement of the cam bar 163 from the effects of vibration or other cause, a tension spring 173 is stretched from the end of the bell crank lever 157 carrying the roller 161 to a spring clip 174 which is secured to the head 88 of the cylinder, and functions to maintain the roller 161 in engagement with the surface 162 of the cam bar as shown in Fig. 2.

Referring particularly to Fig. 3 of the drawings, it will be observed that the bearing surface 162 of the cam bar 163 includes a plurality of graduated stop portions 177, which are adapted to cooperate with the roller 161, during operation of the actuator device as hereinafter more fully explained, to insure movement of the actuator device into definite positions corresponding to the opening or closing of electric contacts in the brake and propulsion controller mechanism, so as to prevent arcing and consequent damage to the contact elements. The number of and positioning of the several step portions 177 will, of course, depend upon the design of the brake and propulsion controller mechanisms 10 and 11, which are not shown in detail.

In order to minimize the effect of freezing temperatures on the operation of the actuator mechanism, an electric heating coil 180 is provided within the housing portion, and may be mounted in any suitable manner such as by means of bracket members 181 carried by the frame structure 13.

*Operation*

When the brake and propulsion control system is initially charged, fluid under pressure is supplied from the usual main reservoir 182, shown in Fig. 8, to the supply pipe 132, and by way of the control valve device 140 on the leading vehicle to the control pipe 139, the fluid pressure in the latter pipe being normally maintained at a predetermined value as already explained.

Referring to Fig. 5 of the drawings, the normal pressure of fluid in the control pipe 139 and in the chamber 138 of each actuator device connected thereto is balanced by the force of the coil spring 145, so that the plunger 128 is thus positioned with the groove 129 thereof in communication with the port 132 and passages 133 and 134. Fluid under pressure is thereby supplied to the piston chambers 84 and 87 in the cylinder 80, it being apparent that so long as the fluid pressure in the control pipe 139 remains at the normal predetermined value, the valve plunger 120 is effective to maintain the opposing fluid pressures acting on the piston 82 substantially balanced.

It will be understood that, although the area of the side of the piston 82 adjacent chamber 87 is slightly smaller than that of the other side due to the space occupied by the rod 89, the force of the spring 106 is sufficient to hold the piston and the elements actuated thereby in their normal or coasting position, as shown in the drawings, when the pressures of fluid in both chambers are equalized. With the rack furniture, including the guide bar 94 and cam block 113 shown in Fig. 1, thus held in coasting position, the springs 66 and 70 are consequently effective to maintain the brake controlling mechanism 11 in release position and the propulsion controller mechanism 10 in coasting or power off position.

In order to effect operation of the driving motors of the vehicles for the purpose of propelling the train, the operator manipulates the control valve 140 so as to cause an increase in the pressure of fluid in the control pipe 139 above the normal pressure. Referring to Fig. 5, upon this increase in control pipe pressure and consequently in the pressure of fluid in the chamber 138, the diaphragm 124 is moved against the opposing force of the spring 145 and through the medium of the stem 122 shifts the valve plunger 120 to the left. As the plunger 120 is thus moved, the annular groove 130 therein establishes communication between the passage 134 and exhaust port 135. Fluid under pressure thus begins to flow from the chamber 87 by way of the passage 134 and exhaust port 135, and the pressure of fluid in the chamber 84, which remains in communication by way of passage 133 and valve groove 129 with the supply pipe 132, becomes effective to move the piston 82 and piston rod 89 to the right, as viewed in the drawing.

In so moving, the piston rod 89 carries with it the rack structure including the cross head member 93, guide bars 94 and 95, head 100, and inclined cam bar 163, as shown in Fig. 2, while the spring 106 yields as the retainer member 103 is shifted along the plunger member 108. The cam bar at the same time acts through the medium of the roller 161 to tilt the bell crank lever 157 in a clockwise direction with respect to the trunnion portion 156, so that the socket member 147 is moved against the spring 145 for gradually increasing the load thereon, as hereinafter more fully explained.

Meanwhile, as the piston rod 89 and associated guide bars 95 and 94 are shifted to the right as just explained, the cam block 113 carried by the guide bar 94 is brought into engagement with the roller 42 and upon continued movement thereby effects turning of the bell crank lever 36 in a counterclockwise direction about the journal pin 37, as viewed in Fig. 1 of the drawings. The bell crank lever 36 in so moving acts through the medium of the pin 38 to pull the link members 34, 32 and 29 so as to operate the controller lever 21 about its shaft 22, and against opposition of spring 70, as shown in Fig. 4, for effecting the desired rotation of the shaft 15 of the propulsion controller mechanism 10. It will be understood that the usual rotary switch elements included in the propulsion controller mechanism 10 are thereby actuated to complete suitable circuits for effecting operation of the propulsion motors of the vehicle.

The rate of operation of the vehicle propulsion motors is of course determined by the angle through which the propulsion controller mechanism 10 is turned, and consequently in accordance with the distance traversed by the piston 82 and associated elements of the actuator mechanism, the movement of which is in turn controlled to correspond to the degree of variation in the pressure of fluid in the control pipe 139.

As hereinbefore mentioned in connection with Fig. 2, movement of the piston 82 and piston rod 89 causes cooperation of the cam bar and bell crank lever 157 for moving the socket member 147 against the spring 145 for increasing the force exerted thereby, and when the spring pressure is thus caused to exceed the control pipe pressure acting on the diaphragm 124 shown in Fig. 5, the spring becomes effective through the medium of the follower 123 and stem 122 to move the valve plunger 120 to the right for cutting off communication between the passage 134 and the exhaust port 135. Further change in the pressures of fluid acting on the piston 82 is consequently prevented, while the fluid pressures are balanced so that the piston and associated movable elements of the actuator mechanism, together with the propulsion controller mechanism 10 operated thereby, are thus held in a position predetermined by the pressure of fluid in the control pipe 139.

It should be understood that all of the actuator mechanisms 14 on the vehicles in the train as shown in Fig. 8 are adapted to respond in exactly the same manner to the increase in control pipe pressure as just explained, so that the propulsion motors throughout the train are operated at a substantially uniform rate according to the will of the motorman operating the control valve device 140 on the leading vehicle. It will be readily apparent that the speed of the train may be increased or decreased as desired by controlling the pressure of fluid in the control pipe 139 through the medium of the control valve device 140, each of the several actuator mechanisms 14 being adapted to respond quickly as already explained to each variation in control pipe pressure for effecting corresponding operation of the propulsion motors.

When it is desired to cut off the supply of power to the vehicle motors, the pressure of fluid in the control pipe 139 is again restored to the normal value by operation of the motorman's control valve device. Upon the resultant operation of the valve pluger 120, shown in Fig. 5, to effect supply of fluid under pressure to the chamber 87, the piston 82 and the slidable rack structure connected thereto are returned to their coasting position. The spring 66 is thereby permitted to move the bell crank lever 36 and link members 34, 32 and 29 to the position illustrated in Fig. 1, while the spring 70 effects movement of the propulsion controller mechanism 10 to its coasting or power-off position.

If it is desired to effect an application of the brakes, the control valve device 140 on the leading vehicle is operated in the usual manner to effect reduction in the pressure of fluid in the control pipe 139 to a value corresponding to the rate or degree of brake application desired.

Referring again to the sectional view of the actuator mechanism on one of the cars shown in Fig. 5, upon the reduction in control pipe pressure in chamber 138 acting on the diaphragm 124, the spring 145 becomes operative through the medium of the follower member 125 and stem 122 to slide the valve plunger 120 to the right for bringing the groove 128 thereof into registration with the passage 133 and the atmospheric vent port 135, thereby initiating discharge of fluid under pressure from the piston chamber 84. As the pressure of fluid in the chamber 84 is thus reduced, the pressure of fluid in the chamber 87 becomes effective to force the piston 82 and rod 89 toward the left, together with the associated rack structure including the guide bars 94 and 95 shown in Fig. 2. It will be understood that the force with which the rack structure is moved to the left exceeds the pressure of the spring 106, which at this time is adapted to yield as the spring retainer member 104 is shifted outwardly, due to engagement by the abutment plates 110 carried by the guide bars, and toward the plate member 103 which is held stationary due to its engagement with the head 109 of the anchored plunger 108.

At the same time, the cam block 113 is carried leftwardly as viewed in Fig. 2 of the drawings, until the surface 115 thereof engages the roller 64, after which continued movement of the cam block under the force applied to the piston within the cylinder 80 is effective to cause movement of the bell crank lever 59 for actuating the brake controller mechanism. As shown in Fig. 1, the bell crank lever 59 is rotated about the pin 61 under the force applied to the roller 64 by means of the cam block 130, and thereby through the medium of the pin 58 pulls the links 57, 55, and 53 inwardly for operating the controller lever 47 and consequently rotating the shaft 16 of the brake controller mechanism 11. The return spring 70 is of course adapted to yield, as the controller lever 47 is thus moved, under the force applied by the lever to the wing portion 78 of the lever 77 and to the plunger 73.

It will be observed on reference to Figs. 2 and 5 of the drawings, that the above described movement to the left of the piston with its piston rod 89 and the associated rack structure including the guide bar 95, the cam bar 163 is also carried in the same direction, thus permitting turning of the bell crank lever 157 in a counterclockwise direction, as the roller 161 rides along the surface 162, under the combined forces of the springs 145 and 173. The load exerted by the spring 145 against the follower member 143 and diaphragm 124 is thus reduced until the pressure of fluid in the chamber 138 communicating with the control pipe 139 again becomes effective to move the diaphragm 124, stem 122 and valve plunger 120 to lap position, in which further venting of fluid under pressure from the chamber 84 to the atmosphere is cut off. The piston 82 and associated movable elements of the actuator mechanism are thus held in the position assumed in response to the reduction in control pipe pressure.

It will be understood that, as already explained in connection with operation of the actuator mechanism in controlling the propulsion motors, each of the actuator mechanisms in the train is adapted to effect application of the associated brakes with substantially the same degree of force, and simultaneously with operation of the other actuator mechanisms throughout the train. It will further be apparent that the motorman can graduate the application of the brakes as desired by varying the pressure of fluid in the control pipe, thereby effecting corresponding movement of each of the brake and propulsion control actuator mechanisms in the manner just explained.

When it is desired to effect the release of the brakes, the pressure of fluid in the control pipe 139 is increased to the predetermined normal value already referred to, thereby effecting operation of the diaphragm 124 and associated valve plunger 120, shown in Fig. 5, to again effect such differential in the fluid pressures acting on the piston 82 as will cause the piston and the associated movable rack structure of the actuator mechanism to assume the normal or coasting position illustrated in the drawings, which operation will be apparent from the drawings and the explanation hereinbefore presented. During return of the piston and slidably mounted rack structure to the coasting position, the spring 66 becomes effective to turn the bell crank lever 59 back into the position shown in Fig. 1, thus operating the various link members associated therewith to permit return of the controller arm 47 to coasting position under the force of the spring 70.

From the foregoing it will now be apparent that the invention provides a sensitive and efficient brake and propulsion control actuator, one of which may be carried on each of a number of motor driven vehicles in a train, and which is automatically operable to effect definite movement of either the associated brake controller or propulsion controller as predetermined in accordance with variation in pressure of fluid in a normally charged control pipe, which fluid pressure in turn is controlled by operation of a motorman's control valve device located on the leading vehicle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle of the class having propulsion controller means, brake controller means, and a source of fluid under pressure, in combination, a control pipe adapted to be charged with fluid under pressure, means operable to vary the pressure of fluid in said pipe above and below a normal pressure, an actuator device comprising movable abutment means operative by fluid under pressure for moving either of said controller means, and fluid pressure responsive valve means operative in accordance with variations in the pressure of fluid in said control pipe for controlling the supply of fluid under pressure from said source to said movable abutment means.

2. In a vehicle of the class having propulsion controller means, and brake controller means, in combination, a control pipe adapted to be charged with fluid at a normal pressure, means operative to vary the pressure of fluid in said pipe above and below said normal pressure, and a fluid pressure responsive actuator device operative in accordance with variations in pressure of fluid in said control pipe to actuate either said propulsion controller means or said brake controller means.

3. In a vehicle of the class having propulsion controller means, brake controller means, and a source of fluid under pressure, in combination, a control pipe adapted to be charged with fluid at a normal pressure, means operative to vary the pressure of fluid in said pipe above and below said normal pressure, and a fluid pressure responsive actuator device comprising a movable abutment cooperative with both the propulsion and brake controller means, and valve means operative according to variations in the pressure of fluid in said control pipe for controlling the balancing of opposing fluid pressures on said movable abutment.

4. In a vehicle brake and propulsion control equipment: a first lever means operable for effecting application of the brakes to various degrees, a second lever means operable for controlling propulsion of the vehicle, yielding means normally urging both of said lever means toward a coasting position wherein the brakes are released while the power for propulsion is cut off, and a common actuator means comprising a member automatically shiftable in one direction for operating the first lever means and in another direction for operating said second lever means, motor means for operating said member, and remote-control means for governing operation of said motor means.

5. In a vehicle brake and propulsion control equipment: a first lever means operable for effecting application of the brakes to various degrees, a second lever means operable for controlling propulsion of the vehicle, yielding means normally urging both of said lever means towards a neutral position wherein the brakes are released while the power for propulsion is cut off, and an actuator device comprising fluid pressure responsive means having a normal position from which said means is shiftable in one direction for operating the first lever means and in another direction for operating the second lever means, and self-lapping valve mechanism automatically operative to effect variations in the pressure of fluid acting on said fluid pressure responsive means.

6. In a brake and propulsion control system for a train of vehicles of the class involving brake means and propulsion means for each vehicle, in combination, a normally charged control pipe extending throughout the train, control valve means carried on at least one of the vehicles for varying the pressure of fluid in said pipe above and below a predetermined normal value, and an actuator device for each vehicle comprising fluid pressure responsive movable abutment means having a coasting position from which said means is shiftable in one direction for controlling operation of the propulsion means and in the opposite direction for controlling application of the brakes of that vehicle, and a self-lapping valve mechanism automatically operative in accordance with an increase or reduction in the pressure of fluid in said control pipe to effect a differential in the pressure of fluid acting on said abutment means for causing correspondingly directed movement thereof proportional to the degree of variation in control pipe pressure.

7. In a brake and propulsion control system for a train of vehicles of a class involving brake means and propulsion means for each vehicle, in combination, a normally charged control pipe extending throughout the train, control valve means carried on at least one of the vehicles for varying the pressure of fluid in said pipe above and below a predetermined normal value, and a control assembly on each vehicle comprising a brake controller mechanism, a propulsion controller mechanism, and fluid pressure responsive actuator means operatively associated therewith and automatically movable in accordance with each increase in control pipe pressure above said normal value to operate said propulsion control mechanism and in accordance with each reduction in said pressure below said normal value to operate said brake controller mechanism.

8. In a brake and propulsion control system for a train of vehicles of the class involving brake means and propulsion means for each vehicle, in combination, a normally charged control pipe extending throughout the train, control valve means carried on at least one of the vehicles for varying the pressure of fluid in said pipe above and below a predetermined normal value, and a control assembly on each vehicle comprising a brake controller mechanism, a propulsion controller mechanism, fluid pressure responsive actuator means operatively associated therewith and operative to effect movement of said propulsion controller mechanism proportional to each increase in control pipe pressure above said value and to effect movement of said brake controller mechanism proportional to each reduction in control pipe pressure below said value, and yieldable means normally positioning said actuator means out of cooperative relation with either of said mechanisms.

9. In a fluid pressure brake and propulsion control equipment for a vehicle, in combination, an actuator piston subject to normally balanced fluid pressures and movable from a coasting position in one direction to initiate and control propulsion of the vehicle and in another direction to effect application of the brakes, valve means operative to control increase and reduction of either of said normally balanced fluid pressures, a spring, a movable abutment subject to the opposing forces of said spring and of a variable control pressure for operating said valve means, and means operative in accordance with movement of said actuator piston for varying the load of said spring.

10. In a fluid pressure brake and propulsion control equipment for a vehicle, in combination, an actuator piston subject to normally balanced opposing fluid pressures and movable from a coasting position in one direction to initiate and control propulsion of the vehicle, and in another direction to effect application of the brakes, valve means operative to control increase and reduction of either of said normally balanced fluid pressures, a control pipe adapted to be charged with fluid the pressure of which can be varied above and below a normal value, and fluid pressure responsive means operative in accordance with variation in said control pipe pressure for operating said valve means.

11. In a fluid pressure brake and propulsion control equipment for a vehicle, in combination, an actuator piston subject to normally balanced opposing fluid pressures and movable from a coasting position in one direction to initiate and control propulsion of the vehicle, and in another direction to effect application of the brakes, valve means operative to control increase and reduction of either of said normally balanced fluid pressures, a control pipe adapted to be charged with fluid the pressure of which can be varied above and below a normal value, and fluid pressure operated means responsive to each increase or reduction in said control pipe pressure for operating said valve means to effect a corresponding shifting of said actuator piston with respect to said coasting position.

12. A brake and propulsion control actuator mechanism for a vehicle comprising movable abutment means subject to opposing fluid pressures and shiftable in one direction for controlling the propulsion of the vehicle and in an other direction for effecting application of the brakes, a spring coacting with said movable abutment means and adapted to position said means in a coasting position when said opposing fluid pressures are substantially equalized, valve means responsive to variations in a control pressure to effect corresponding differential in said opposing fluid pressures for causing movement of said movable abutment means, and means cooperative with said movable abutment means to effect lapping of said valve means for checking movement of said abutment means at the position corresponding to the degree of variation in said control pressure.

13. In a fluid pressure brake and propulsion control equipment for a vehicle: a rotary brake controller mechanism including an operating arm, a rotary propulsion controller mechanism including an operating arm, a pair of spaced oppositely aligned bell crank levers operatively connected to said operating arms, respectively, spring means urging said levers toward each other and into a coasting position, a control pipe adapted to be charged with fluid at a pressure variable above a normal value in controlling propulsion and below said value in effecting application of the brakes, and a fluid pressure operated actuator mechanism comprising a movable member interposed between and operatively aligned with said bell crank levers, and means responsive to variations in the pressure of fluid in said control pipe for operating said movable member.

14. In a fluid pressure brake and propulsion control equipment for a vehicle: a rotary brake controller mechanism including an operating arm, a rotary propulsion controller mechanism including an operating arm, a pair of spaced oppositely aligned bell crank levers operatively connected to said operating arms, respectively, spring means urging said levers toward each other and into a coasting position, a control pipe adapted to be charged with fluid at a pressure variable above a normal value in controlling propulsion and below said value in effecting application of brakes, and common actuator means comprising a movable member interposed between and operatively aligned with said bell crank levers, a piston connected to said member and subject to opposing fluid pressures, and a self-lapping valve mechanism operative to effect a differential in the fluid pressures acting on said piston for effecting movement thereof in either direction proportional to any variation in the pressure of fluid in said control pipe.

15. In a propulsion and brake control equipment for a vehicle, in combination, a housing carried by the vehicle, a frame mounted therein, brake controller means secured to said frame, propulsion controller means secured to said frame in coaxial alignment with said brake controller means, a pair of spaced oppositely arranged bell crank levers pivoted on said frame and operatively connected to said propulsion and brake controller means, respectively, spring means biasing both said controller means toward a coasting position, a cylinder mounted on said frame having pressure chambers, a rack slidably mounted on said cylinder and having a member operatively interposed between said bell crank levers, a movable abutment subject to the opposing pressures of fluid in said chambers for sliding said rack in either direction, and a self-lapping valve mechanism supported by said cylinder and operable in accordance with variations in a control pressure for controlling supply and release of fluid under pressure to and from said chambers.

16. In a vehicle brake and propulsion control equipment, in combination, a first lever means operative for effecting application of the brakes to various degrees, a second lever means operable for controlling propulsion of the vehicle, a member movable in one direction for operating the first lever means and in another direction for operating the second lever means, yielding means biasing said member toward an intermediate coasting position and out of operative relation with either lever means, a fluid pressure responsive movable abutment operatively connected to said member, and fluid pressure control means operable to vary the pressure of fluid acting on said movable abutment.

17. In a vehicle brake and propulsion control equipment, in combination, a first lever means operable for effecting operation of the brakes to various degrees, a second lever means operable for controlling propulsion of the vehicle, a member movable in one direction for operating the first lever means and in another direction for operating the second lever means, a fluid pressure responsive movable abutment operatively connected to said member, fluid pressure control means operable to vary the pressure of fluid acting on said movable abutment, and spring means cooperative with said movable abutment for resisting movement thereof in either direction.

18. A brake and propulsion control actuator mechanism for a vehicle comprising movable abutment means subject to opposing fluid pressures and shiftable in one direction for controlling the propulsion of the vehicle and in another direction for effecting application of the brakes, a spring coacting with said movable abutment means and adapted to position said means in a coasting position when said opposing fluid pressures are substantially equalized, valve means responsive to variations in a control pressure to effect corresponding differential in said opposing fluid pressures for causing movement of said movable abutment means, a cam member carried by said movable abutment means, and lever means cooperative with said cam member for automatically controlling said valve means and thereby determining movement of said abutment means in accordance with the degree of variation in said control pressure.

19. A brake and propulsion control actuator mechanism for a vehicle comprising movable abutment means subject to opposing fluid pressures and shiftable in one direction for controlling the propulsion of the vehicle and in another direction for effecting application of the brakes, a spring coacting with said movable abutment means and adapted to position said means in a coasting position when said opposing fluid pressures are substantially equalized, valve means responsive to variations in a control pressure to effect corresponding differential in said opposing fluid pressures for causing movement of said movable abutment means, a cam member carried by said movable abutment means, lever means cooperative with said cam member to effect lapping of said valve means for checking movement of the abutment means at the position corresponding to the degree of variation in said control pressure, and means for yieldingly resisting vibration of said cam member and lever means.

20. In a vehicle brake and propulsion control equipment, in combination, a first lever means operable for effecting application of the brakes to various degrees, a second lever means operable for controlling propulsion of vehicle, a movable member operatively aligned with both of said lever means, a spring cooperative with said member for normally holding both said lever means in coasting position wherein the brakes are released while the power for propulsion is cut off, said spring being yieldable upon movement of the lever by operation of either lever means, and other spring means also biasing both lever means toward said coasting position and adapted to exert increased force for maintaining the inoperative lever means in coasting position during operation of the other lever means out of coasting position.

21. In a brake and propulsion control system for a vehicle of the class equipped with brake means and propulsion means, in combination, a control pipe normally charged with fluid under pressure, control valve means operable for varying the pressure of fluid in said control pipe above and below a predetermined normal value, and a control assembly comprising a brake controller mechanism, a propulsion controller mechanism, and fluid pressure responsive actuator means operatively associated therewith and automatically movable in accordance with each increase in control pipe pressure above said normal value to operate said propulsion control mechanism and in accordance with each reduction in said pressure below said normal value to operate said brake controller mechanism.

ELLIS E. HEWITT.